United States Patent
Ogawa et al.

(10) Patent No.: US 7,172,808 B2
(45) Date of Patent: Feb. 6, 2007

(54) MASKING MATERIAL

(75) Inventors: Masanori Ogawa, Tokai (JP); Kuninori Itou, Tokai (JP)

(73) Assignee: Nagoya Oilchemical Co., Ltd., Aichi (JP)

( * ) Notice: Subject to any disclaimer, the term of this patent is extended or adjusted under 35 U.S.C. 154(b) by 0 days.

(21) Appl. No.: 10/510,663

(22) PCT Filed: Sep. 24, 2002

(86) PCT No.: PCT/JP02/09815

§ 371 (c)(1),
(2), (4) Date: Oct. 7, 2004

(87) PCT Pub. No.: WO03/084677

PCT Pub. Date: Oct. 16, 2003

(65) Prior Publication Data

US 2005/0165162 A1    Jul. 28, 2005

(51) Int. Cl.
*B32B 27/04* (2006.01)
*B32B 27/08* (2006.01)
*C08L 71/12* (2006.01)

(52) U.S. Cl. .............. 428/220; 428/41.5; 428/174; 428/343; 428/355; 525/68; 525/92 D; 525/132; 525/133; 525/149

(58) Field of Classification Search ............ 525/133, 525/132, 68, 92 D, 149; 428/220, 174, 343, 428/355, 41.5
See application file for complete search history.

(56) References Cited

U.S. PATENT DOCUMENTS 6,045,883 A * 4/2000 Akiyama et al. .......... 428/35.7
6,610,442 B2 * 8/2003 Kurasawa et al. .......... 429/176

* cited by examiner

*Primary Examiner*—Ana Woodward
(74) *Attorney, Agent, or Firm*—Donald S. Dowden; Cooper & Dunham LLP

(57) ABSTRACT

The object of the present invention is to provide a masking member(11) which has good heat resistance and can be used repeatedly.

To attain this object, the present invention provides a masking member made of a polymer alloy having a sea-island structure containing polyolefin in a continuous phase and one or more kind(s) of engineering plastic selected from among a group consisting of methyl pentene copolymer, polysulphone, polyethersulphone, polyphenylenesulphide, polyphenyleneether, polyamideimide, polyetherimide, and polyether-etherketone in a dispersed phase.

14 Claims, 10 Drawing Sheets

31: masking member
32A, 32B, 32C: fitting groves
32D: flange
33: body
34: front bumper
35: skirt part
36A, 36B: reinforcing frame bars
36C: support pillars

MASKING MATERIAL

FIELD OF THE INVENTION

The present invention relates to a masking member used to protect a part of an article from being coated.

BACKGROUND OF THE INVENTION

A masking member is attached to a part of an article (a masking part) to which coating should not be applied. Said masking member can be removed from said part after the curing of said coating film on said article by heating, resulting in said coating film's loss of fluidity. Accordingly, said masking member must be heat resistant during the coating process.

Hitherto, material consisting of thermoplastic resin mixed with inorganic filler has been provided for use in such masking members (TOKKAIHEI 2-126966).

Among thermoplastic resin materials, polyolefin in particular has strong solvent resistance and is mechanically reinforced by being mixed with inorganic filler, increasing its thermal conductivity and thermal resistance, making said masking member reusable.

However, with respect to the above mentioned conventional masking members, even when mixed with an inorganic filler, its maximum thermal resistance is about 100° C., so that in a surface treatment process requiring a higher temperature, said masking member is easily deformed, and not reusable.

As a means to solve the problem as described above in the prior art, a masking member which is made of an engineering plastic has been provided (TOKKAIHEI 5-261323).

Said engineering plastic has a high level of heat resistance and a masking member made of said engineering plastic can withstand temperatures higher than 150° C., so that said masking member can be used repeatedly.

Nevertheless, the faults of said engineering plastics are their poor moldability due to their high softening temperature and low fluidity, and due to their hardness and brittleness a liability to crack or break easily under excessive applied force.

DISCLOUSURE OF THE INVENTION

To solve the above described problems, the present invention provides a masking member made of a polymer alloy having a sea-island structure containing polyolefin in a continuous phase and one or more kind(s) of engineering plastic selected from among a group consisting of methylpentene copolymer, polysulphone, polyethersulphone, polyphonelenesulphide, polyphenyleneether, polyamideimide, polyetherimide, and polyether-etherketone, in a dispersed phase, with the mixing ratio of said polyolefin and one or more kind(s) of said engineering plastic being preferably in the range of between 20:80 and 80:20 by weight ratio.

In said masking member made of polymer alloy consisting of polyolefin and engineering plastic, said polyolefin is preferably polypropylene and said engineering plastic is preferably polyphenylene ether or modified polyphenylene ether.

Further, a rubber-like material is preferably added to said polymer alloy, and said rubber-like material is preferably styrenic rubber-like material. Furthermore, a compatibility aid agent is preferably added to said polymer alloy.

Said masking member of the present invention may be manufactured using any method, with vacuum and/or pressure forming using polymer alloy sheeting being preferable for any mass-production of said masking member. Further, the thickness of said polymer alloy sheeting is preferably in the range of between 0.1 mm to 1.5 mm.

Said engineering plastic has excellent heat resistance, a masking member made of said engineering plastic has a high level of mechanical strength, and does not soften or deform even at temperatures higher than 150° C.

In a case where said engineering plastic is dispersed in said polyolefin, forming a polymer alloy having a sea-island structure in which said polyolefin is in a continuous phase, and said engineering plastic is in a dispersed phase, the molding workability of said polymer alloy sheeting is almost the same as that of said polyolefin without having suffered heat resistance degradation, and the rigidity and extension properties of said polymer alloy sheeting are improved, and even when said polymer alloy sheeting is thin(generally 0.2 mm to 0.8 mm), deep drawing molding can be easily carried out with no breakage of said polymer alloy sheeting, the breaking strength of said thin polymer alloy sheet masking member also having much improved.

BRIEF DESCRIPTION OF THE DRAWINGS

FIG. 1 shows a perspective view of a masking member and the pillar to which said masking member is attached.

FIG. 2 shows a sectional view along the A—A line in FIG. 4 illustrating the provisional attachment of said masking member to said pillar.

FIG. 3 shows a sectional view along the A—A line in FIG. 4 illustrating the end of said masking member attached to said pillar.

FIG. 4 shows a perspective view illustrating a case where said masking member is attached to said pillar.

FIG. 6 shows a perspective view of said masking member and the front bumper of a car to which said masking member is attached.

FIG. 7 shows a sectional side view illustrating a case where said masking member is attached to said bumper.

FIG. 8 shows a vertical sectional view illustrating a case where said masking member is attached to said bumper.

FIG. 9 shows a perspective view of said masking member and a car door window frame to which said masking member is attached.

FIG. 10 shows a perspective view illustrating a case where said masking member is attached to said car door window frame.

FIG. 11 shows a sectional view along the A—A line in FIG. 10.

FIG. 12 shows a sectional view along the B—B line in FIG. 10.

FIG. 13 shows a perspective view of said masking member and the instrument panel of a car prior to coating.

FIG. 14 shows a sectional view along the A—A line in FIG. 13.

FIG. 15 shows a perspective view illustrating said car instrument panel to which said masking member is attached, after coating.

FIG. 16 shows a sectional view along the B—B line in FIG. 15.

FIG. 17 shows a perspective view of said car instrument panel coated in two colors.

Figure 1:
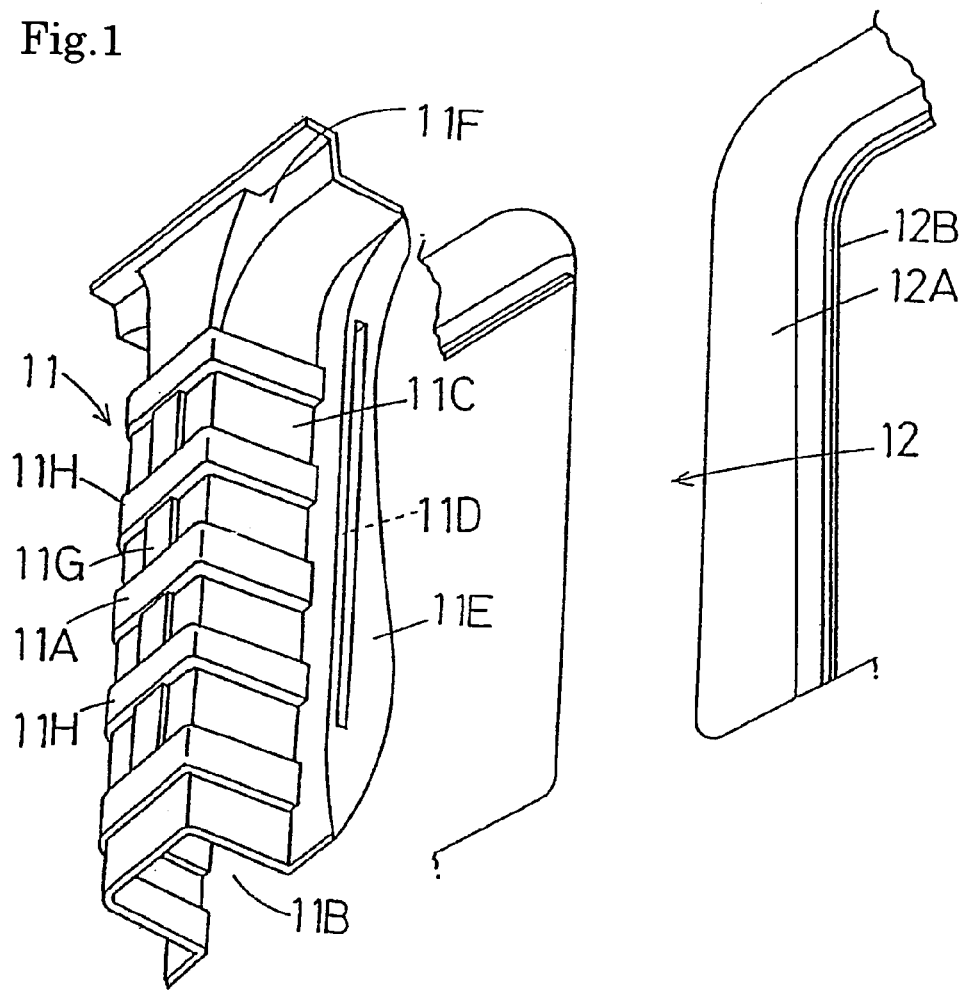
FIGS. 1 to 4 relate to a first embodiment of the present invention.

In the drawings 11, 21, 31, 41, 51, 61, 71 represent masking members

DESCRIPTION OF THE PREFERRED EMBODIMENTS

The polyolefin used in the present invention is such as polyethylene, polypropylene, ethylene-propylene copolymer, ethylene-vinyl acetate copolymer and the like, and polypropylene having a high rigidity is a desirable polyolefin for the present invention.

The engineering plastic used in the present invention is such as: a thermoplastic-type engineering plastic chosen from among polysulfone (PSF), polyethersulfone (PES), polyphenylene ether (PPE), polyphenylene sulfide (PPS), polyetheretherketone (PEEK), polyamideimide (PAI). polyetherimide (PEI), methylpentene copolymer (TPX).

Two or more kinds of said engineering plastic may be mixed together in the present invention. The preferable engineering plastic may be a PPE or modified PPE which has good moldability.

Said modified PPE is such as a PPE to which styrenic monomer(s) such as styrene, α-methylstyrene, α-ethylstyren, α-methylvinyltoluene, α-methyldialkylstyrene, o, m or p-vinyltoluene, o-ethylstyrene, p-ethylstyrene, 2,4-dimethylstyrene, o-chlorostyrene, p-chlorostyrene, o-bromstyrene, 2,4-dichlorostyrene, 2-chloro-methylstyrene, 2,6-dichlorostyrene, vinylnaphthalene, vinylanthracene or the like and the like is(are) graft-copolymerized or polymer alloy in which styrenic resin(s) such as polystyrene, styrene-acrylonitrile resin, acrylonitrile-butadiene-styrene resin (ABS), high impact polystyrene(HIPS) or the like, is (are) mixed into said PPE.

In the present invention, rubber-like material(s) may be further added to said polymer alloy.

Said rubber-like material may be such as synthetic rubber such as (AR, acrylic rubber), (BR, butyl rubber), (silicone rubber), (UR, urethane rubber), (fluoride type rubber), (polysufide type rubber), (graft modified rubber), (BR, butadiene rubber), (IR isoprene rubber), (CR, chloroprene rubber), (IBR, polyisobutylene rubber), (polybutene rubber), (IIR, isobutene-isoprene rubber), (ABR, acrylate-butadiene rubber), (SBR, styrene-butadiene rubber), (NBR, acrylonitrile-butadiene rubber), (PBR, pyridine-butadiene rubber), (SIR, styrene-isoprene rubber), (acrylonitrile-chloroprene rubber), (styrene-chloroprene rubber)or the like; natural rubber; a styrenic elastomer such as styrene-butadiene-styrene block copolymer (SBS), a styrene-isoprene-styrene block copolymer (SIS), α-methylstyrene-butadiene-α-methylstyrene block copolymer (α-MeS-Bd-MeS), α-methylstyrene-isoprene-α-methylstyrene block copolymer, styrene-hydrogenated polyolefin-styrene block copolymer (SEBS, SEPS); polyolefinic elastomer, polyurethane group elastomer, polyamide group elastomer, or the like.

Considering its compatibility with said engineering plastic, especially with PPE, a styrenic rubber-like material such as styrene-butadiene-rubber, styrenic elastomer, or the like, is (are) preferably used.

Said engineering plastic may be added to said polyolefin at a weight ratio of between 20:80 and 80:20, more preferably at 30:70 and 70:30, and most preferably at a weight ratio of between 40:60 and 60:40, with the resulting polymer alloy having a sea-island structure in which said polyolefin is in a continuous phase, and one or more kinds of said engineering plastic is(are) in a dispersed phase. Commonly, 2 to 50 parts by weight of said rubber-like material(s) is(are) added to 100 parts by weight of said polymer alloy.

A compatibility aid agent may be added to said polymer alloy, or the resulting mixture of said rubber-like material and said polymer alloy, to improve the compatibility of each component.

Since said compatibility aid agent is made of compounds having the compatibility with any of components of said polymer alloy or said mixture, the components in said mixture may be mixed together uniformly being mediated by said compatibility aid agent. Accordingly, the properties of each component are effectively exercised, so that said polymer alloy or said mixture has excellent heat resistance and moldability, and a masking member having a complex shape can be easily manufactured by vacuum forming, pressure forming, or the like.

For instance, said compatibility aid agent used in the polymer alloy of aromatic engineering plastics such as PPE, modified PPE, PPS and the like, and of polyolefin, or the mixture of said polymer alloy and the rubber-like material, may be such as a block or graft copolymer produced by chemically bonding polyphenyleneether and polypropylene, a block or graft copolymer of polypropylene and polystyrene, a block or graft copolymer of polyphenyleneether and ethylene-butene copolymer, a hydrogenated diblock or triblock copolymer of an alkenyl aromatic compound (such as styrene), and a conjugated diene compound (such as butadiene, isoprene), or the like. Commonly, a 0.1 to 60 by weight % of said compatibility aid agent may be added to polymer alloy or said mixture of said polymer alloy and said rubber-like material(s).

In said polymer alloy or said mixture of polymer alloy and said rubber-like material, an inorganic filler such as calcium carbonate, magnesium carbonate, barium sulphate, calcium sulphate, calcium sulfite, calcium phosphate, calcium hydroxide, magnesium hydroxide, aluminum hydroxide, magnesium oxide, titanium oxide, iron oxide, zinc oxide, alumina, silica, diatom earth, dolomite, gypsum, talc, clay, asbestos, mica, glass fiber, carbon fiber, calcium silicate, calcium carbonate, bentonite, white carbon, carbon black, iron powder, aluminum powder, stone powder, blast furnace slag, fly ash, cement, zirconia powder or the like; a natural fiber such as cotton, hemp, bamboo fiber, coconut fiber, wool or the like; an organic synthetic fiber such as polyamide fiber, polyester fiber, acrylic fiber, viscose fiber, acetate fiber, vinyl chloride fiber, vinylidene chloride fiber and the like; an inorganic fiber such as asbestos fiber, glass fiber, carbon fiber, ceramic fiber, metallic fiber, whisker or the like; an organic filler such as linter, linen, sisal, wood flour, coconut flour, walnut flour, starch, wheat flour or the like, may be added to improve the shape preserving property, the dimensional stability, the compression strength, the tensile strength, and the like.

Said filler may usually be added in an amount of between about 0.05 and 200 by weight % to said polymer alloy.

If desirable, one or more kind(s) of thermoplastic resin such as polyvinyl chloride resin, acrylic resin, methacrylic resin, polyvinylidene chloride resin, vinyl propionate resin, polyester resin or the like may be mixed into said polymer alloy or said mixture.

Said polymer alloy may be colored with a pigment or dyestuff to distinguish the masking parts, and also, a plasticizer such as a DOP, DBP or the like, an antioxidant, antistatic agent, crystallization agent, flame retardant, antiflaming agent, insecticide, antiseptic, waxes, lubricant, age resister, ultraviolet absorber, blowing agent such as chemical blowing agent or capsule type blowing agent, or the like, may be mixed in with said polymer alloy. Two or more kinds of said agent may be mixed, then added to said polymer alloy.

A desirable commercial PPE/PP polymer alloy may be such as Lemalloy P(PX-600, PX-601, PX-603, PX-620, PX-612A, PX-600P, PX-600N) from Mitsubishi Engineering Plastic Co., Noryl (PX7110, PX7112, PX7115, PX7145, PX630, PX640) from Nippon GE plastics Co., and the like.

To manufacture a masking member using said polymer alloy or said mixture, commonly the vacuum forming or vacuum-pressure forming method is commonly applied, a procedure in which a film or a sheet of said polymer alloy or said mixture, can be formed accurately and precisely into a deep drawing shape or complicated shape, preparing said masking member for efficient mass production. However, pressure forming, press molding, blow molding, injection molding, or the like may also be applied to manufacture said masking member.

A sheet or an expanded sheet of thermoplastic resin such as polyolefin such as polyethylene, polypropylene, ethylene-propylene-copolymer, ethylene-vinyl acetate copolymer or the like, polyvinyl chloride resin, acrylic resin, methacrylic resin, poly-vinylidene chloride resin, styrenic resin, vinyl propionate resin, styrene-butadiene copolymer, polyester resin or the like may be laminated onto said sheet of polymer alloy.

In order to enhance the affinity of masking member surface made of said polymer alloy or said mixture with paint or adhesive, a corona discharge treatment, primer coating treatment or the like, may be wholly or partially performed on the surface of said making member. A primer used in said primer coating is, for example, a synthetic resin type primer such as modified polyolefin (e.g. chlorinated polypropylene), olefin copolymer (e.g. ethylene-vinylacetate copolymer), acrylic synthetic resin, vinyl synthetic resin, acrylic synthetic resin including amino group and/or amide, vinyl synthetic resin including amino group and/or amide, amino synthetic resin, epoxy resin and the like; synthetic rubber such as stylene-butadiene rubber, acrylnitrile-butadiene rubber, chloroprene-rubber, polybutadien, and the like; and a low-molecular weight compound such as aluminum alcholate or aluminum chelate agent such as aluminum isopropylate, aluminum triacetylacetonate and the like; an alkyl metal such as 2-ethylhexyl lead, hexadecyl lithim and the like; an organotin compound such as dibutyl tin diacetate, di-n-butyl tin dioxide and the like; a silane compound such as methylvinyl dichloro silane and the like; a metal complex salt of 1,3-dicarbonyl compound such as acetylacetone lithium, acetylacetone beryllium and the like; an organotitanium compound such as tetrabutyl titanate and the like; a boric acid compound such as tri-n-butyl borate, triphenyl borate and the like; a phosphate such as trioleil phosphate, tridecyl phosphate and the like; a metal salt of a carboxylic acid such as magnesium stearate, cobalt naphtenic acid and the like; a metal thioalcholate such as n-potassium dodecylmercapto chloride and the like; a thiodicarboxylate such as zinc 2-ethylhexane dithiocarboxylate and the like; a metal salt of a dithiocarbamic acid such as nickel dimethyldithiocarbamate, copper dimethyldithiocarbamate and the like; a metal salt of sulfonic acid such as nickel benzenesulfonate and the like; an organophosphate compound such as dibutylvanadium phosphate and the like. One or more kinds of said primer may be mixed together.

Said primer has the affinity with both said engineering plastic as a material for said masking member, and synthetic resin used for a paint vehicle or an adhesive. The preferable primer is an acrylic synthetic resin containing quarternary ammonium salt, or a synthetic resin containing an amino group.

For the primer coating treatment, a solution or an emulsion(latex) of one or more kinds of said primer is coated on the surface of said engineering plastic as the material for the masking member and then dried.

Prior to said primer coating treatment, an affinity treatment may be performed on the surface of said engineering plastic. Examples of said affinity treatment include flame treatment, sulfuric acid treatment, corona discharge treatment, or the like, with the surface of said engineering plastic being slightly carbonized by said treatment, in order to obtain the affinity with the synthetic resin, and in the case of said corona discharge treatment, an additional roughening of said surface.

The masking member of the present invention made of said polymer alloy or said mixture has better properties of adhesion to coating materials than a conventional masking member made of polyolefin (for example, polypropylene) to which inorganic filler(s) is(are) added.

Since said masking member of the present invention has a little water absorbability and an excellent dimensional stability. Said masking member does not expand, shrink or warp.

EMBODIMENTS

The First Embodiment

FIGS. 1 to 4 relate to the first embodiment of the present invention. The masking member (11) of this embodiment is used to protect pillar shaped members such as the center pillar (12) of a car from being coated. Said masking member (11) consists of a body (11A), having a U-shape in cross section, to the inside (11B) of which the body (12A) of the center pillar (12) is to be fitted, a pair of flanged grooves (11D, 11D) formed along the lower edges of the side walls (11C, 11C) from said body (11A) into which a pair of flanges(12B, 12B) from said center pillar (12) are each to be inserted, a pair of rear fitting parts (11E, 11E) each extending from said flanged grooves(11D, 11D), and a top end fitting part (11F) extending from the top of said body (11A); and a longitudinal reinforcing rib (11G) and horizontal reinforcing ribs (11H) are formed around the circumference of said body (11A). Said masking member (11) is manufactured by vacuum forming a sheet (thickness 0.4 mm) made of a polymer alloy mixture in which 5 parts by weight of styrene butadiene rubber are mixed in with 100 parts by weight of a polymer alloy having a sea-island structure in which the polypropylene (PP) is in a continuous phase and the PPE is in a dispersed phase (40:60 by weight ratio) with 2 parts by weight of talc being mixed into 100 parts by weight of said mixture.

Figure 2:
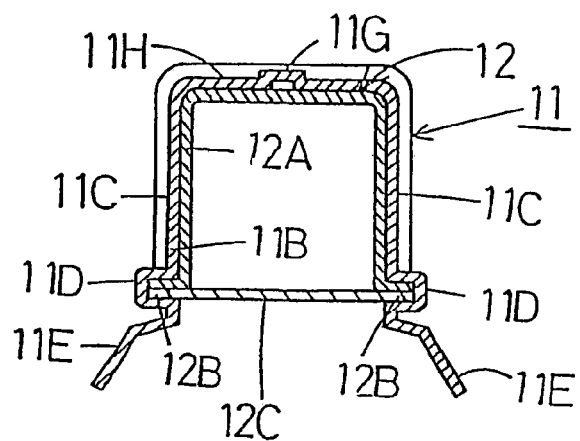

As shown in FIG. 2, said masking member (11) is provisionally attached to the body (12A) of said center pillar

(12) by fitting said body (12A) to the inside (11B) of said body (11A) of said masking member (11), and further, inserting the flanges (12B, 12B) of said center pillar (12) into the flanged grooves (11D, 11D) of said masking member (11) respectively.

Figure 3:
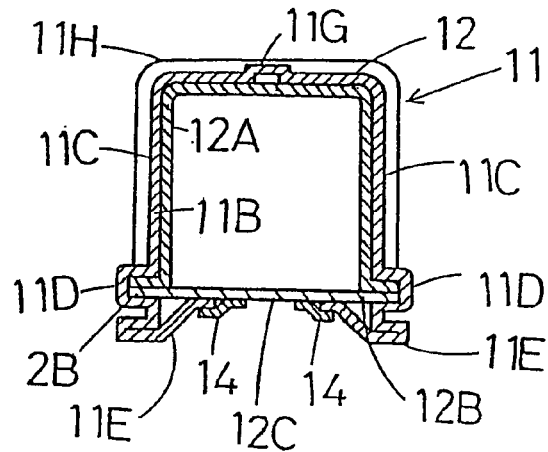

After said provisional attaching, the rear fitting parts (11E, 11E) are fitted to the rear panel (12C) of said center pillar (12) respectively turning said rear fitting parts (11E, 11E) to the back side, said rear fitting parts (11E, 11E) being fixed to side rear panel (12C) with an adhesive tape (14), tacks, or the like as shown in FIG. 3.

Figure 4:
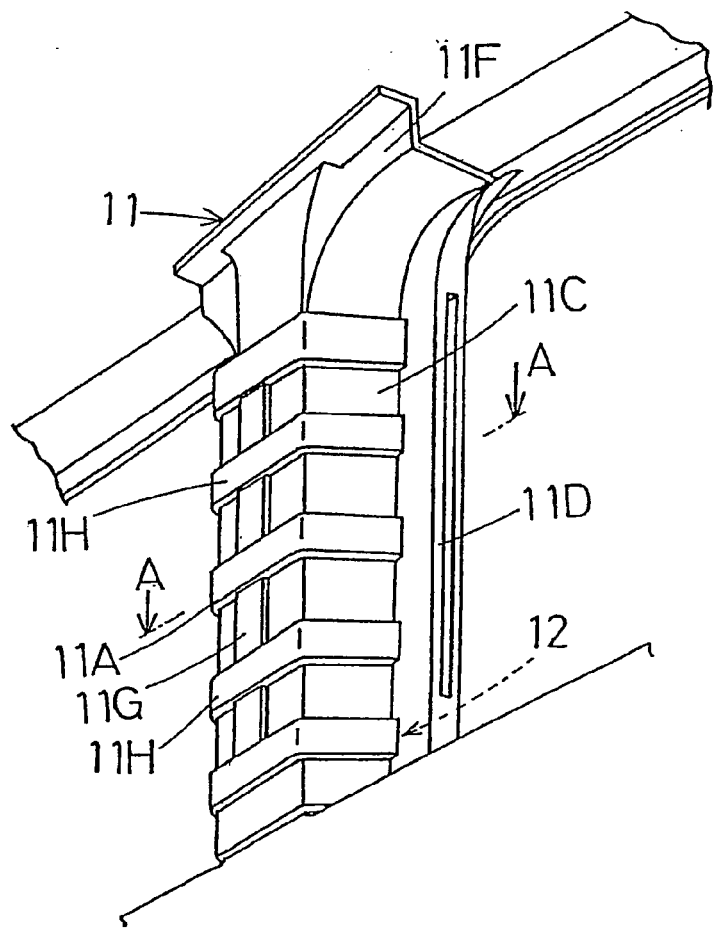

After said masking member (11) is attached to said center pillar (12) as shown in FIG. 4, the car is then coated with a thermosetting melanine-alkyl resin paint, or the like.

The Second Embodiment

Figure 5:
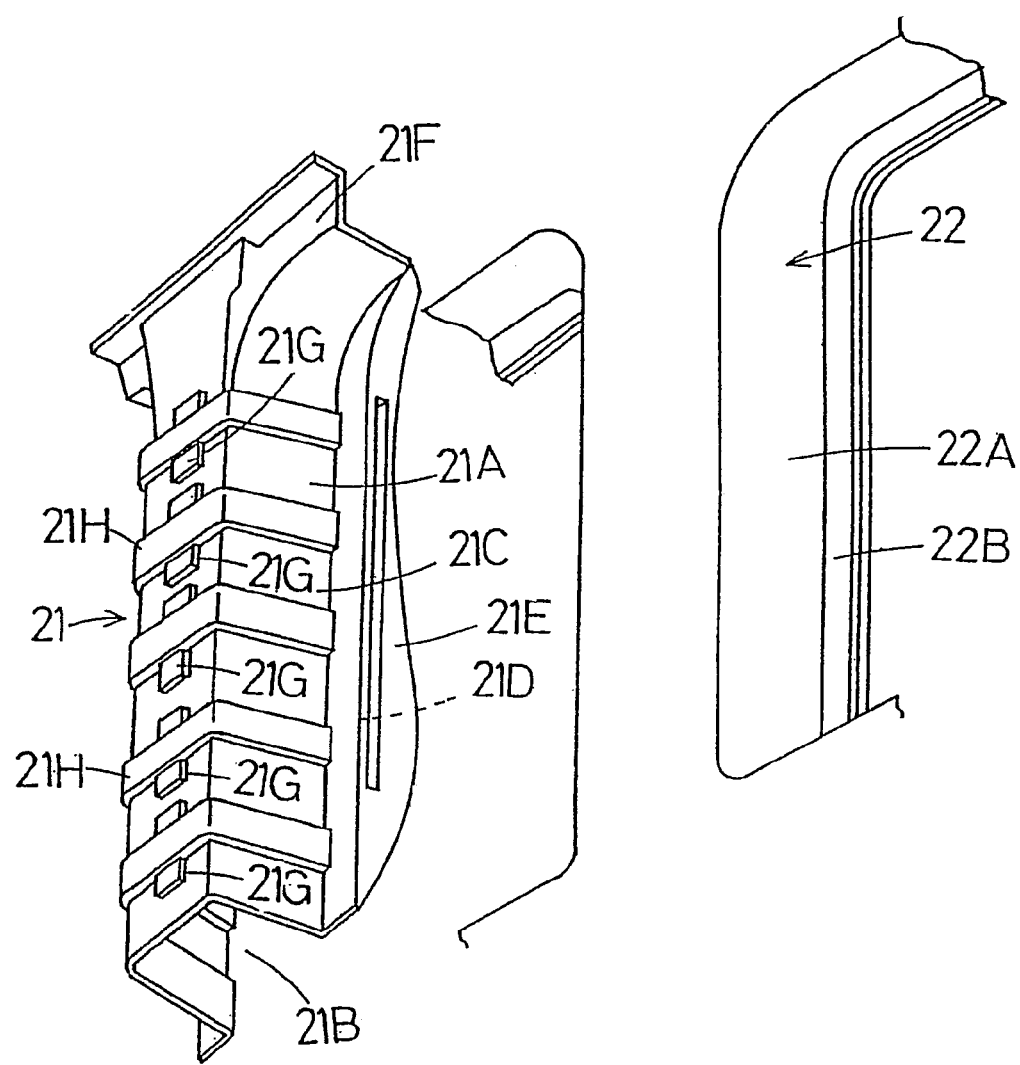
FIG. 5 relates to the second embodiment, and shows a perspective view of said masking member and the pillar to which said masking member is attached.

FIG. 5 relates to the second embodiment of the present invention. The masking member (21) of this embodiment consists of a body (21A), having a U-shape cross section, to the inside of which the body (22A) of the center pillar (22) is to be fitted, a pair of flanged grooves (21D, 21D) formed along the lower edges of the side walls (21C, 21C) of said body (21A) into which a pair of flanges (22B, 22B) from said center pillar (22) are each to be inserted, a pair of rear fitting parts (21E, 21E) extending from said flanged grooves (21D, 21D), and a top end fitting part (21F) extending from the top of said body (21A); and a plural number of longitudinal reinforcing ribs (21G) and horizontal reinforcing ribs (21H) are formed around the circumference of said body (21A).

Differing from the first embodiment, said longitudinal reinforcing ribs (21G) occur at intervals in this embodiment. Said masking member is manufactured by vacuum-pressure forming a sheet (thickness 0.3 mm) made of polymer alloy mixture in which 15 parts by weight parts of SBS is mixed into 100 parts by weight of a polymer alloy having a sea-island structure in which the polypropylene (PP) is in a continuous phase, and the PPS is in a dispersed phase (60:40 weight ratio), with 3 parts by weight of carbon black being further mixed into said mixture, a chlorinated polypropylene coating film is formed on the surface of said masking member.

In the same way as stated in the first embodiment, said masking member (21) is provisionally attached to the body (22A) of said center pillar (22) by fitting said body (22A) to the inside (21B) of said body (21A) of said masking member (21), and then further inserting each flange (22B, 22B) of said center pillar (22) into the flanged grooves (21D, 21D) of said masking member (21), following which said rear fitting parts (21E, 21E) are each fitted to the rear panel of said center pillar (22), turning said rear fitting parts (21E, 21E) to the back side, said rear fitting parts (21E, 21E) being fitted to said rear panel of said center pillar (22) with adhesive tape, tacks, or the like.

After said masking member (21) is attached to said center pillar (22), the car is coated with paint.

In the first embodiment, said masking member (11) is apt to bend horizontally along said longitudinal reinforcing rib (11G) since said rib (11G) is continuous, while in this embodiment, said masking member (21) has increased horizontal bending strength along its ribs (21G), since said ribs (21G) occur at intervals. Further, since chlorinated polypropylene coating film is formed on the surface of said masking member, the resulting coating paint film firmly adheres to the surface of said masking member, so that pieces of said coating paint film peeling from the surface of said masking member will not fly in their surroundings.

The Third Embodiment

Figure 6:
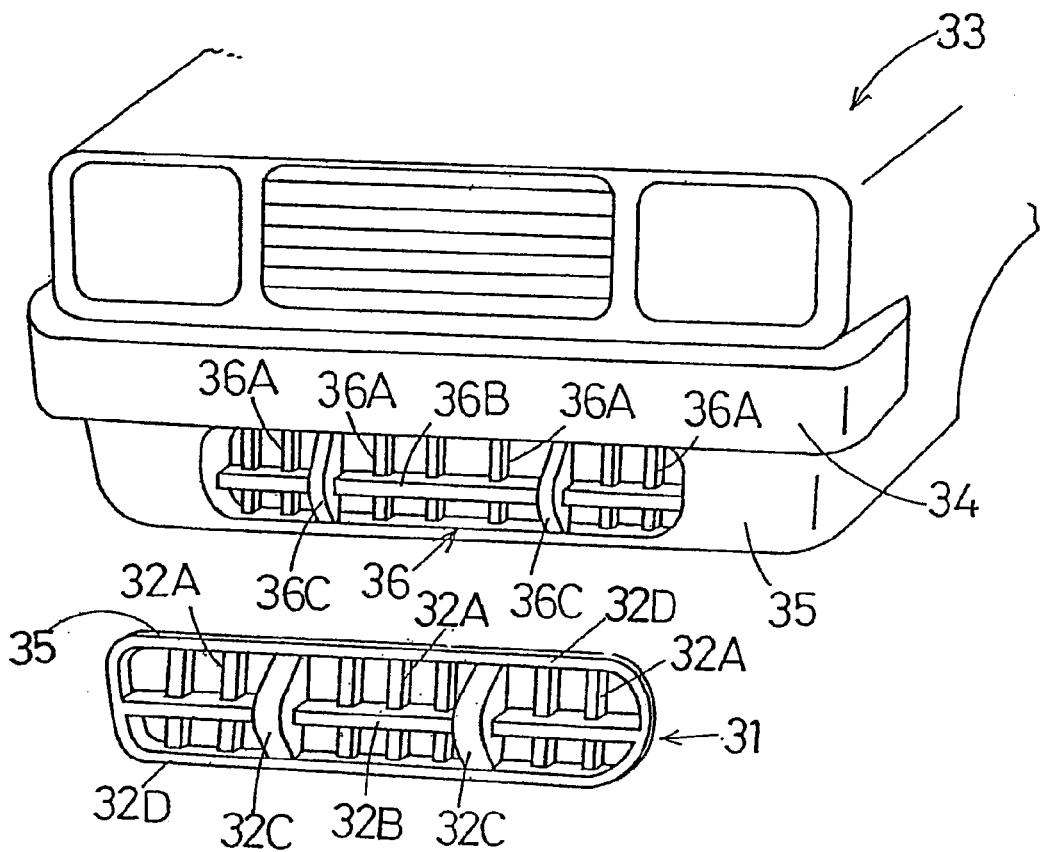
FIGS. 6 to 8 relate to the third embodiment.
Figure 7:
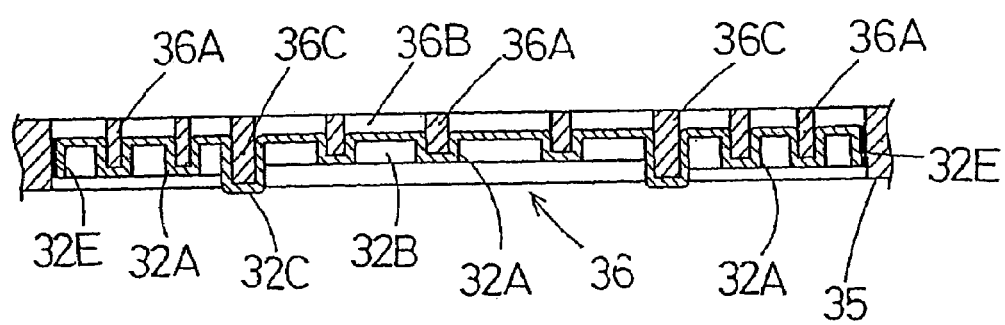
Figure 8:
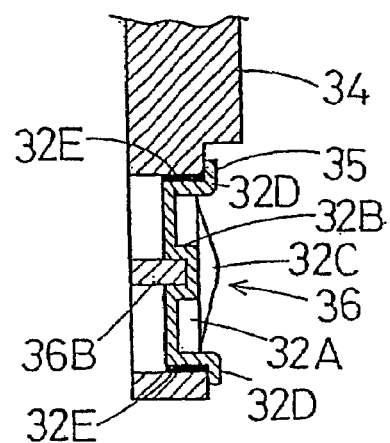
Figure 9:
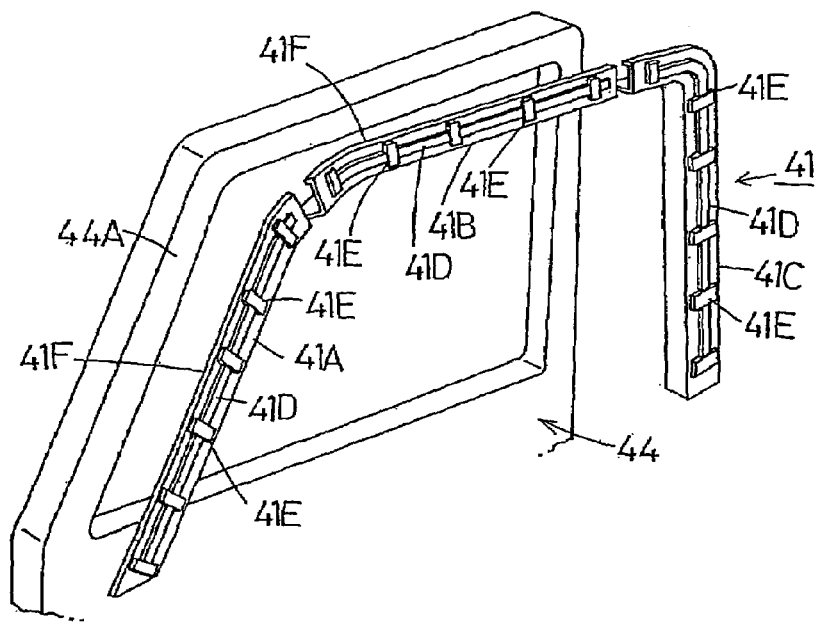
FIGS. 9 to 12 relate to the fourth embodiment of the present invention.

FIGS. 6 to 8 relate to the third embodiment of the present invention. As shown in FIG. 6, a car body (33) has a front bumper (34) and when said car body (33) is coated, the masking member (31) of this embodiment is attached to the air inlet hole (36) of the lower skirt part (35) of said front bumper (34). A plural number of reinforcing frame bars (36A, 36B) are set lengthwise and breadthwise, with a pair of support pillars (36C) being set in both sides of said air inlet hole (36). Correspondingly, frame bar grooves (32A, 32B) to accommodate said reinforcing frame bars (36A, 36B) are set lengthwise and breadthwise in said masking member (31), with a pair of pillar grooves (32C) to accommodate said support pillars (36C, 36C) being set in both sides of said masking member (31). A flange (32D) is formed along the front of said masking member, and further, on the surface of said flange (32D), a pressure sensitive adhesive layer (32E) is formed, with said fitting grooves (32A, 32B, 32C) working as ribs to support said masking member (31). At the cross point of the horizontal (longitudinal) fitting groove (32B) and the vertical (short side direction) fitting groove (32A) said horizontal fitting groove (32B) overlaps said vertical fitting groove (32A), for the purpose of improving the horizontal rigidity of said masking member (31), while at the cross point of said vertical fitting groove (32C) and vertical (short side direction) fitting groove (32A), said vertical fitting groove (32C) overlaps said horizontal fitting groove(32B), to improve the rigidity of said masking member (31) in its vertical direction.

Said masking member (31) is manufactured by vacuum forming a sheet (thickness 0.2 mm) made of a polymer alloy mixture into which 8 parts by weight parts of talc is mixed in a polymer alloy having sea-island structure in which a mixture of polypropylene and polyethylene (80:20 by weight ratio) is into a continuous phase and said PPE is in a dispersed phase (50:50 by weight ratio).

Said masking member (31) is fitted to the inside of said air inlet hole (36), and each reinforcing frame bar (36A, 36B) is inserted into each frame bar groove (32A, 32B), each support pillar (36C) is inserted into each pillar groove (32C), and said masking member (31) is fixed to the inside of said air inlet hole (36) with its pressure sensitive adhesive layer (32E). Nevertheless, said pressure sensitive adhesive layer (32E) may not always be necessary in the present invention.

As described above, said masking member (31) is attached to said air inlet hole (36) of the skirt part (35), being a masking part, following which said car body (33) is coated with paint, after which, the resulting coating film is cured by heating.

The Fourth Embodiment

FIGS. 9 to 12 relate to the fourth embodiment of the present invention. The masking member (41) of this embodiment is used to protect the window frame (44A) of a car door (44), said masking member (41) consisting of three divided parts (41A, 41B, 41C), each cross section of each divided part being L-shaped. A longitudinal reinforcing rib (41D) and cross ribs (41E) are formed in each divided part (41A, 41B, 41C).

Said masking member (41) is manufactured by vacuum-pressure forming a sheet (thickness 0.5 mm) made of a polymer alloy mixture in which 2 parts by weight of talc is mixed into a polymer alloy having a sea-island structure in which the polypropylene is in a continuous phase and the PPS is in a dispersed phase, with a corona discharge treatment being performed on the surface of said masking member.

Figure 10:
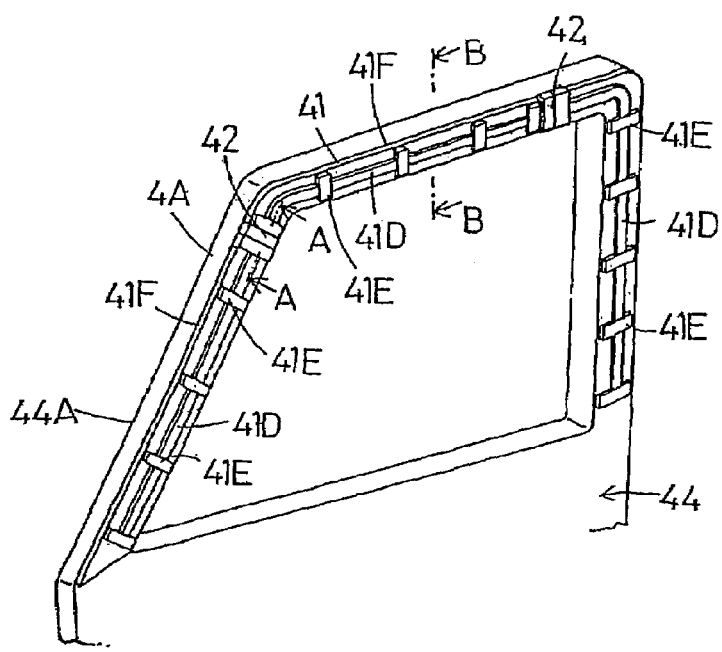

In order to attach said masking member (41) to said window frame (44A) of said door (44), each divided part (41A, 41B, 41C) is attached to said window frame (44A), overlapping the connecting ends of each said divided part (41A, 41B, 41C), with said overlapping connecting ends being fixed with adhesive tape (42), etc. as shown in FIG. 10.

Figure 11:
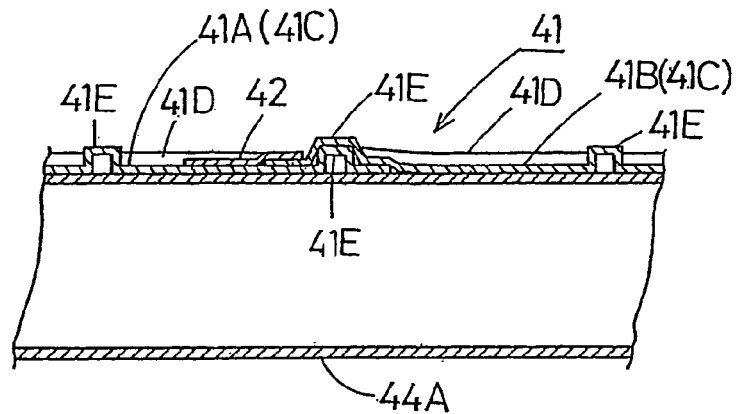
Figure 12:
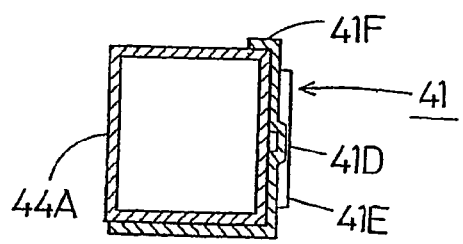

In this case, at said overlapping connecting ends, a cross rib (41E) of the connecting end of one of the divided part 41A (41C) is fitted under a cross rib (41E) of the connecting end of the other divided part 41B (41C) as shown in FIG. 11 and upper edge hook part (41F) of each divided part (41A, 41B, 41C) is hung on the upper edge of said window frame (44A) as shown in FIG. 12. After coating, said masking member (41) is removed from said window frame (44A) of the door (44). Said window frame (44A) is not coated with paint since said window frame (44A) was protected by said masking member (41).

The Fifth Embodiment

FIGS. 13 to 17 relate to the fifth embodiment of the present invention. In the front of the instrument panel (52), there is an installation hole (55) in which a globe component can be installed, installation holes (56, 57) in which an audio system can be installed, an installation part (58) in which instruments can be installed, an installation part (59) in which a small articles box can be installed, and the likes are provided, with said instrument panel being divided into an upper part (52A) and a lower part (52B).

Figure 14:
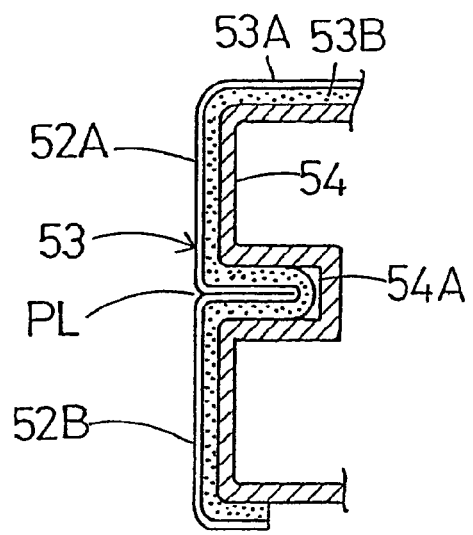

As shown in FIG. 14, said instrument panel (52) consists of a base (54) and surface trim (53) which is put on the surface of said base (54), said surface trim (53) consisting of a surface layer (53A) made of a non-woven fabric, synthetic leather, or the like, and a wadding layer (53B) made of a non-woven fabric, foamed plastic sheet, or the like, backed with said surface layer (53A), and further, said surface layer (53A) is colored in a designated color (base color), with the thickness of said wadding layer (53B) being elastically compressible.

Along the boundary between said upper part (52A) and said lower part (52B), a groove (54A) is formed in said base (54), and a parting line PL is formed by the inserting of said surface trim (53) into said groove (54A). Said surface trim (53) is fixed into said grooves (54A), with the thickness of said wadding layer (53B) being compressed, and rebounding elastically.

Figure 13:
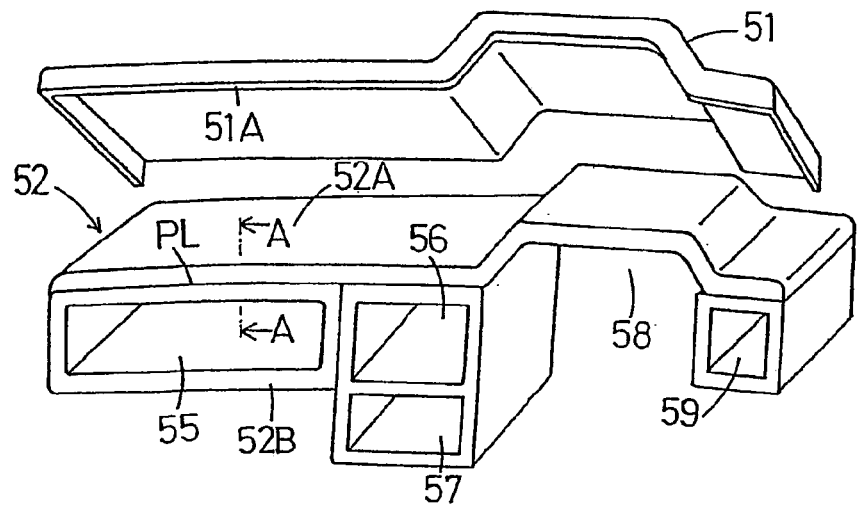
FIGS. 13 to 17 relate to the fifth embodiment of the present invention.

Since said instrument panel (52) is decorated with said surface trim (53), being common to both upper and lower parts, said upper part (52A) and said lower part (52B) are each the same color. Said instrument panel (52) may be installed in the car body as it is, or in a case where said upper part (52A) and lower part (52B) of said instrument panel (52) are to be colored in different colors respectively, a masking member (51) is used as shown in FIG. 13. Said masking member (51) has a shape corresponding to said upper part (52A) of said instrument panel (52), with an engaging flange (51A) being formed around the circumference of said masking member (51).

Figure 15:
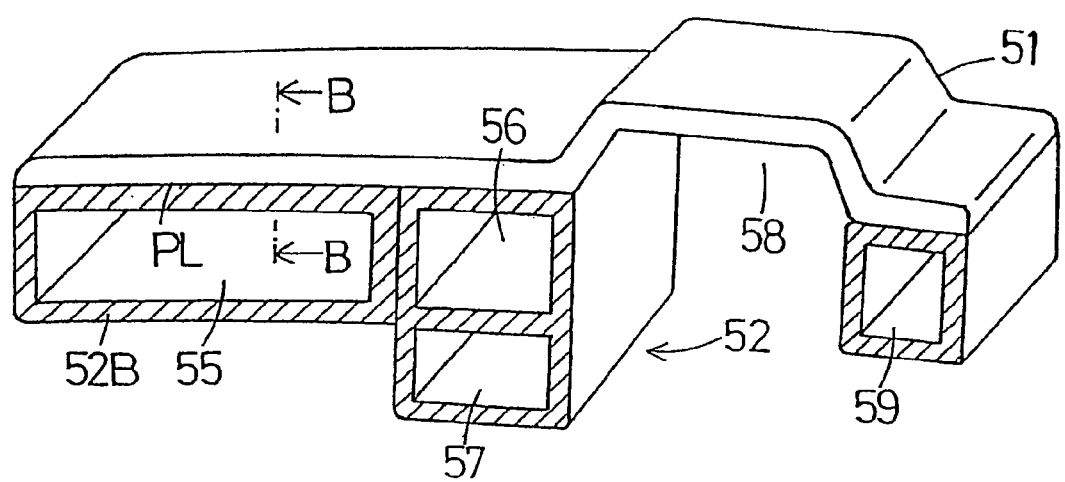
Figure 16:
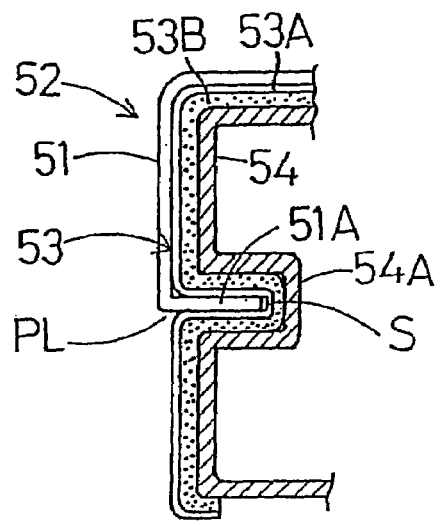
Figure 17:
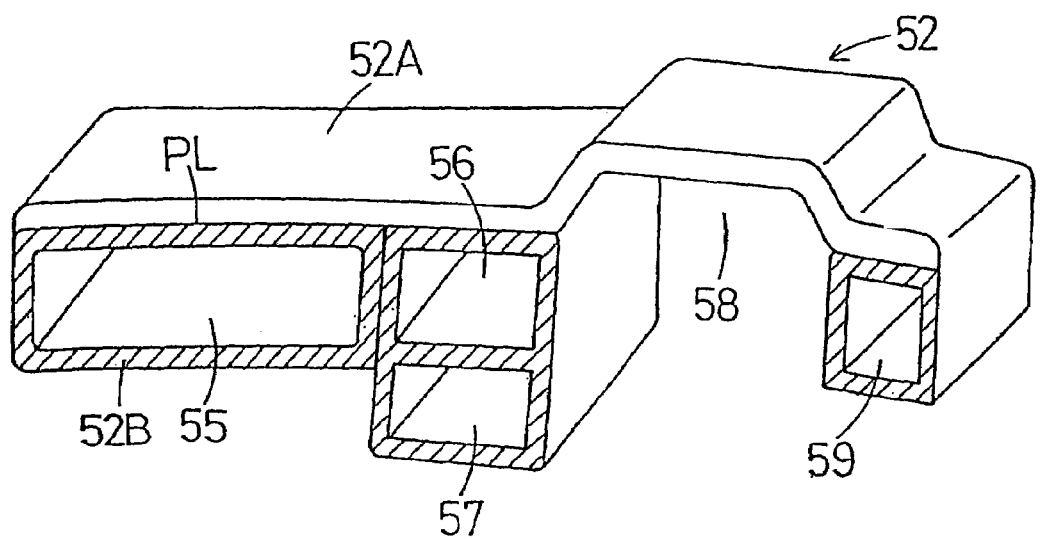

As shown in FIG. 15, said masking member (51) is put on said upper part (52A), and as shown in FIG. 16, is fixed by inserting said engaging flange (51A) into the slit S of said parting line PL. By inserting said engaging flange (51A) of said masking member (51) into said slit S of said parting line PL, the thickness of said wadding layer (53B) of said surface trim (53) is compressed. Due to its elasticity, said engaging flange (51A) is pinched and fixed by said surface trim (53). As described above, said masking member (51) is put on said upper part (52A) of said instrument panel and then said lower part (52B) is coated in a different color from said upper part (52A) by a method such as spray coating. After said coating, said masking member (51) is removed from said upper part (52A)

In the manner described above, said instrument panel (52) whose upper and lower parts are each coated in different colors, is easily prepared.

Said masking member (51) of this embodiment is manufactured by pressure forming or press molding a sheet (thickness 0.4 mm) made of a polymer alloy mixture in which 10 parts by weight of SEBS, 2 parts by weight of titanium oxide, and 0.5 parts by weight of carbon black are mixed in with 100 parts by weight parts of a polymer alloy in which a mixture of polypropylene: nylon 6 (85:15 by weight ratio) is in a continuous phase, and the PPE is a dispersed phase.

The Sixth Embodiment

A masking member having the same shape as that of THE FIRST EMBODIMENT was manufactured using the polymer alloy described below using the same method as described in THE FIRST EMBODIMENT.

A polymer alloy of PPE and PP to which a compatibility aid agent is added: Lemalloy(PX620). Mitsubishi Engineering Plastics Co. Said masking member having been used for masking of the center pillar in as THE FIRST EMBODIMENT.

The Seventh Embodiment

Figure 18:
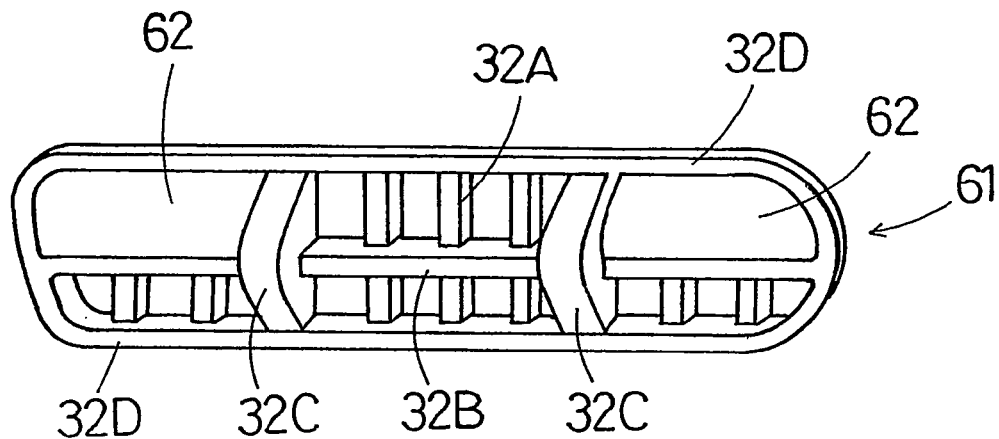
FIG. 18 shows a perspective view of said masking member of the seventh embodiment.

A masking member (61), as shown in FIG. 18 was manufactured, said masking member being used for the masking of the air inlet hole (36) of said front bumper (34) of the car in THE THIRD EMBODIMENT.

In said masking member (61), the fitting grooves (32A, 32B, 32C) in which said reinforcing frame bars (36A, 36B) and said support pillars (36C, 36C)are inserted respectively, with convex parts (62, 62) projecting from the front of said masking member(61), and a flange (32D) around the front of said masking member being formed. The lengthwise rigidity of said masking member (61) is improved by the shape of said convex parts (62, 62). By improving its lengthwise rigidity, the swelling of both ends of said masking member caused by warping of said masking member (61) is prevented, said warping being produced by the curing of the paint film applied to said masking member during coating.

Although said reinforcing frame bars (36A, 36B) do not fit into said convex parts (62, 62), said masking member(61) is fixed to said air inlet hole (36) by said fitting grooves (32A, 32B, 32C), without any trouble.

Generally, in a masking member of this type (61), it is not always necessary to set all of said fitting grooves (32A,32B, 32C) into which all of said reinforcing frame bars (36A, 36B) and, said supporting pillars (36C, 36C) are to be inserted, as the necessary number of fitting grooves (32A, 32B, 32C) to fix said masking member to said air inlet hole (36) may be set into said masking member. Further, concave parts may be formed instead of said convex parts (62, 62) and said concave parts are expected to have the same effect as said convex parts.

Said masking member (61) was manufactured using the same method as described in THE THIRD EMBODIMENT, using the polymer alloy described below.

The polymer alloy of PPE and PP into which said compatibility aid agent is added: Lemalloy(PX601), Mitsubishi Engineering plastics Co.

The Eighth Embodiment

Figure 19:
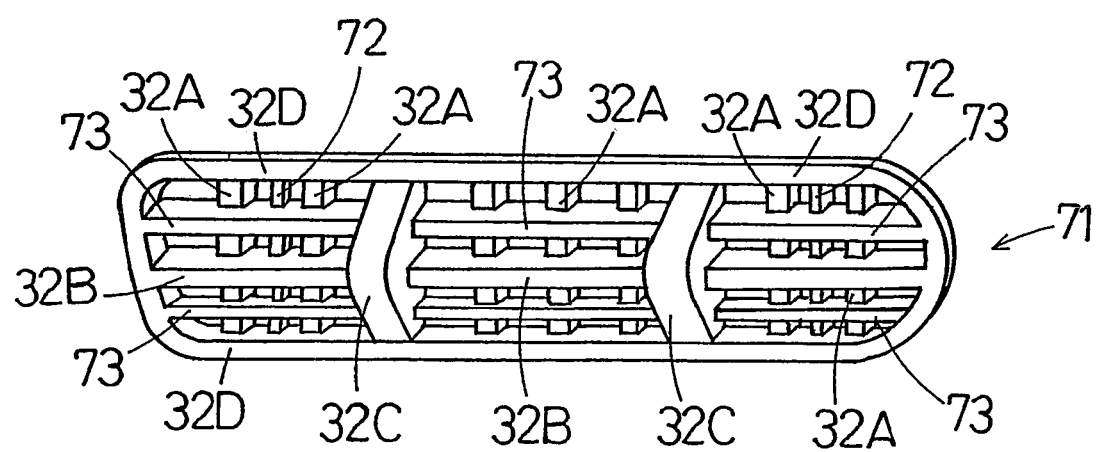
FIG. 19 shows a perspective view of said masking member of the eighth embodiment.

The masking member (71), shown in FIG. 19, for masking said air inlet hole (36) of said front bumper (34) of the car in THE THIRD EMBODIMENT was manufactured.

In said masking member (71), fitting grooves (32A, 32B, 32C) into which said reinforcing frame bars (36A, 36B) and said supporting pillars (36C,36C) are fitted, vertical ribs (72, 72), horizontal ribs (73, 73), and a flange along the front of said masking member (71) are formed. Although said fitting grooves (32A, 32B, 32C) work as ribs, the rigidity of said masking member (71) in both vertical and horizontal directions is further improved by said vertical ribs (72, 72) and horizontal ribs (73, 73).

These ribs give rigidity to the masking member along its lengthwise direction, but the rigidity in its crosswise direction is degraded, since the masking member is apt to be folded at said rib. However, at the cross point of ribs, in a case where one rib overlaps another, the rigidity along said overlapping rib can be improved.

In said masking member (71) of this embodiment, since said horizontal ribs (73, 73) are settled to overlap said vertical ribs (72, 72), the lengthwise (horizontal) rigidity of said masking member (71) is greatly improved. By improving the lengthwise rigidity of said masking member (71), the swelling at either end of said masking member (71) caused by warping of said masking member (71) is prevented, said warping being caused by the curing of the paint coating film applied to said masking member (71), during coating.

Said masking member (71) of this embodiment was manufactured using the same method as described in the THIRD EMBODIMENT, with the polymer alloy described below.

A polymer alloy of PPE and PP in which a compatibility aid agent is added: Nory 1(PX7145), Nippon GE Plasitic Co.

INDUSTRIAL UTILITY

In the present invention, a masking member is provided, having excellent heat and crack resistance, and excellent moldability suitable for deep drawing shaping and/or complicated shaping, and also suitable for vacuum forming, vacuum-pressure forming or pressure forming which enables mass production. With said moldability, said masking member can be formed into any shape corresponding to the masking parts, and when said vacuum, vacuum pressure or pressure forming is applied, a thin polymer alloy sheet can be used, resulting in low material costs. As a result, the masking member of the present invention can be used repeatedly.

What is claimed is:

1. A masking member having a shape that conforms to the shape of a predetermined part of an article, so that said masking member can be fitted to said predetermined part to prevent a coating from being applied to said predetermined part, said masking member comprising a polymer alloy having a sea-island structure in which polyolefin forms a continuous phase, polyphenyleneether and/or polyphenyleneether modified by the addition of a polystyrene group resin forms a dispersed phase and said masking member is manufactured by vacuum and/or pressure forming of a polymer alloy sheet.

2. A masking member made of a polymer alloy in accordance with claim 1, wherein said polyolefin and polyphenyleneether and/or modified polyphenyleether are mixed together at a weight ratio of between 20:80 and 80:20.

3. A masking member made of a polymer alloy in accordance with claim 2, wherein said polyolefin is polypropylene.

4. A masking member made of a polymer alloy in accordance with claim 2, wherein rubber-like material(s) is (are) further added to said polymer alloy.

5. A masking member made of a polymer alloy in accordance with claim 2, wherein compatibility aid agent(s) is (are) further added to said polymer alloy.

6. A masking member made of a polymer alloy in accordance with claim 1, wherein said polyolefin is polypropylene.

7. A masking member made of a polymer alloy in accordance with claim 6, wherein rubber-like material(s) is (are) further added to said polymer alloy.

8. A masking member made of a polymer alloy in accordance with claim 6, wherein compatibility aid agent(s) is (are) further added to said polymer alloy.

9. A masking member made of a polymer alloy in accordance with claim 1, wherein rubber-like material(s) is (are) further added to said polymer alloy.

10. A masking member made of a polymer alloy in accordance with claim 9, wherein said rubber-like material(s) is (are) styrenic rubber-like material(s).

11. A masking member made of a polymer alloy in accordance with claim 10, wherein compatibility aid agent(s) is (are) further added to said polymer alloy.

12. A masking member made of a polymer alloy in accordance with claim 9, wherein compatibility aid agent(s) is (are) further added to said polymer alloy.

13. A masking member made of a polymer alloy in accordance with claim 1, wherein compatibility aid agent(s) is (are) further added to said polymer alloy.

14. A masking member made of a polymer alloy in accordance with claim 1, the thickness of said polymer alloy sheet being in the range of between 0.1 mm and 1.5 mm.

* * * * *